United States Patent
Arbuckle et al.

(10) Patent No.: US 9,278,746 B1
(45) Date of Patent: Mar. 8, 2016

(54) SYSTEMS AND METHODS FOR REDUNDANT DRIVE-BY-WIRE CONTROL OF MARINE ENGINES

(71) Applicant: Brunswick Corporation, Lake Forest, IL (US)

(72) Inventors: Jason S. Arbuckle, Horicon, WI (US); Matthew W. Snyder, Fond du Lac, WI (US); John R. Boatman, Fond du Lac, WI (US); Michael P. Dengel, Fond du Lac, WI (US)

(73) Assignee: Brunswick Corporation, Lake Forest, IL (US)

( * ) Notice: Subject to any disclaimer, the term of this patent is extended or adjusted under 35 U.S.C. 154(b) by 115 days.

(21) Appl. No.: 13/904,878

(22) Filed: May 29, 2013

Related U.S. Application Data

(60) Provisional application No. 61/786,889, filed on Mar. 15, 2013.

(51) Int. Cl.
| | |
|---|---|
| *B63H 21/14* | (2006.01) |
| *B63H 21/21* | (2006.01) |
| *F02D 41/26* | (2006.01) |
| *B60W 50/02* | (2012.01) |
| *B60W 50/04* | (2006.01) |

(52) U.S. Cl.
CPC ............. *B63H 21/14* (2013.01); *B63H 21/21* (2013.01); *F02D 41/266* (2013.01); *B60W 50/0205* (2013.01); *B60W 50/04* (2013.01); *B63H 2021/216* (2013.01); *G05B 2219/24189* (2013.01)

(58) Field of Classification Search
None
See application file for complete search history.

(56) References Cited

U.S. PATENT DOCUMENTS

| | | | | |
|---|---|---|---|---|
| 5,267,542 | A * | 12/1993 | Keskula | 123/406.65 |
| 6,273,771 | B1 * | 8/2001 | Buckley | B63H 21/213 |
| | | | | 114/144 RE |
| 6,382,122 | B1 | 5/2002 | Gaynor et al. | |
| 6,704,628 | B1 * | 3/2004 | Fennel et al. | 701/33.7 |
| 6,881,106 | B1 | 4/2005 | Gonring | |
| 6,892,129 | B2 * | 5/2005 | Miyano | F02D 41/22 |
| | | | | 123/295 |
| 7,399,212 | B2 * | 7/2008 | Okuyama | 440/84 |

(Continued)

FOREIGN PATENT DOCUMENTS

EP 2267292 A1 * 12/2010 ............ F02D 41/22

OTHER PUBLICATIONS

Wikipedia, Serial Communication, Feb. 17, 2013, p. 1-11.*

(Continued)

*Primary Examiner* — Yonel Beaulieu
*Assistant Examiner* — Kevin P Mahne
(74) *Attorney, Agent, or Firm* — Andrus Intellectual Property Law LLP

(57) ABSTRACT

Systems and methods are for drive-by-wire control of a marine engine. An input device is manually operated to provide operator inputs to an engine control unit (ECU) located with the engine. The ECU has a main processor that controls speed of the engine based upon the inputs. The ECU also has a watchdog processor that receives the inputs and that monitors operations of the main processor based upon the inputs. The operations of the main processor are communicated to the watchdog processor via a communication link. When communication between the main processor and watchdog processor fails, the watchdog processor determines whether the main processor is properly functioning based upon the speed of the engine.

25 Claims, 2 Drawing Sheets

(56) References Cited

U.S. PATENT DOCUMENTS

| | | | |
|---|---|---|---|
| 7,620,465 B2 * | 11/2009 | Degoul | B60T 8/321 700/19 |
| 7,941,253 B1 | 5/2011 | Brant | |
| 2004/0226397 A1 * | 11/2004 | Hanai | 74/504 |
| 2005/0049768 A1 * | 3/2005 | Yokochi et al. | 701/36 |
| 2005/0263132 A1 * | 12/2005 | Yanagihara | 123/396 |
| 2008/0148107 A1 * | 6/2008 | Takaishi et al. | 714/51 |
| 2009/0038347 A1 * | 2/2009 | Finch | D06F 37/42 68/12.02 |
| 2012/0065823 A1 * | 3/2012 | Taguchi et al. | 701/22 |
| 2012/0315809 A1 * | 12/2012 | Kuriyagawa et al. | 440/1 |
| 2013/0066500 A1 * | 3/2013 | Wyatt et al. | 701/22 |

OTHER PUBLICATIONS

Freescale, TPU Time Processing Unit Reference Manual, 2004 Publication, Freescale Semiconductor Inc., p. 1-1 to 1-4, A-11 to A-13; C-3 to C-6.*

\* cited by examiner

SYSTEMS AND METHODS FOR REDUNDANT DRIVE-BY-WIRE CONTROL OF MARINE ENGINES

CROSS-REFERENCE TO RELATED APPLICATION

The present U.S. utility patent application claims the benefit of and priority to U.S. Provisional Patent Application Ser. No. 61/786,889, filed Mar. 15, 2013, which is incorporated herein by reference in entirety.

FIELD

The present disclosure relates to systems and methods for controlling marine engines.

BACKGROUND

The following U.S. Patents are incorporated herein by reference, in entirety.

U.S. Pat. No. 6,273,771 discloses a control system for a marine vessel that incorporates a marine propulsion system that can be attached to a marine vessel and connected in signal communication with a serial communication bus and a controller. A plurality of input devices and output devices are also connected in signal communication with the communication bus and a bus access manager, such as a CAN Kingdom network, is connected in signal communication with the controller to regulate the incorporation of additional devices to the plurality of devices in signal communication with the bus whereby the controller is connected in signal communication with each of the plurality of devices on the communication bus. The input and output devices can each transmit messages to the serial communication bus for receipt by other devices.

U.S. Pat. No. 6,382,122 discloses an auto detect system for a marine vessel in which the various associations and relationships between marine propulsion devices, gauges, sensors, and other components are quickly and easily determined. The system performs a method which automatically determines the number of marine propulsion devices on the marine vessel and, where needed, prompts the boat builder or marine vessel outfitter to enter various commands to identify particular marine propulsion devices with reference to their location on the marine vessel and to identify certain other components, such as gauges, with reference to both their location at a particular helm station and their association with a particular marine propulsion device.

U.S. Pat. No. 6,881,106 discloses a method for monitoring voltage changes along a cable. First and second controllers monitor voltage potentials at first and second locations along the cable and these voltage potentials are compared to determine whether or not voltage drops exist along the cable. These voltage drops would normally be caused by improperly connected or damaged nodes which increase the resistance to the power provided by a power source.

U.S. Pat. No. 7,399,212 discloses a boat that can include batteries, a generator, a remote control unit provided in a hull, and an outboard motor controlled through the remote control unit so as to generate thrust. The batteries and the generator can be connected to the remote control unit and the outboard motor via power supply cables. The remote control unit and the outboard motor can be connected via drive by wire controller area network ("DBW CAN") cables. At least two systems of power supply cables and at least two systems of DBW CAN cables can also be provided.

SUMMARY

This Summary is provided to introduce a selection of concepts that are further described herein below in the Detailed Description. This Summary is not intended to identify key or essential features of the claimed subject matter, nor is it intended to be used as an aid in limiting the scope of the claimed subject matter.

In one example, a drive-by-wire control system is for a marine engine. The control system has an input device that is manually operable to provide operator inputs to an engine control unit (ECU) located with the engine. The ECU has a main processor that receives the inputs and controls engine speed based upon the inputs. The ECU also has a watchdog processor that receives the inputs and that monitors operations of the main processor based upon the inputs. A communication link is provided by which the operations of the main processor are communicated to the watchdog processor. When communication fails between the main processor and the watchdog processor, the watchdog processor determines whether the main processor is properly functioning based upon the engine speed, which is communicated to the watchdog processor via an engine speed link. The engine speed link can be an electrical connection carrying a digital signal. During normal operations, the main processor can be programmed to limit the engine speed to below a threshold, and when the communication fails, the watchdog processor can monitor the engine speed and reset the main processor when the engine speed is above the threshold.

In other examples, a method is for operating a drive-by-wire control system for a marine engine. The method can include: providing operator inputs to an engine control unit (ECU) located with the engine; controlling with a main processor in the ECU, the speed of the engine based upon the inputs; receiving the inputs with a watchdog processor in the ECU; monitoring operations of the main processor that are based upon the inputs; and when communication fails between the main processor and the watchdog processor, determining, with the watchdog processor, whether the main processor is properly functioning based upon the speed of the engine.

BRIEF DESCRIPTION OF THE DRAWINGS

Examples of systems and methods for controlling marine engines are described with reference to the following drawing FIGURES. The same numbers are used throughout the FIGURES to reference like features and components.

DETAILED DESCRIPTION OF THE DRAWINGS

In the present Detailed Description, certain terms have been used for brevity, clearness and understanding. No unnecessary limitations are to be implied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. §112, sixth paragraph only if the terms "means for" or "step for" are explicitly recited in the respective limitation.

Figure 1:
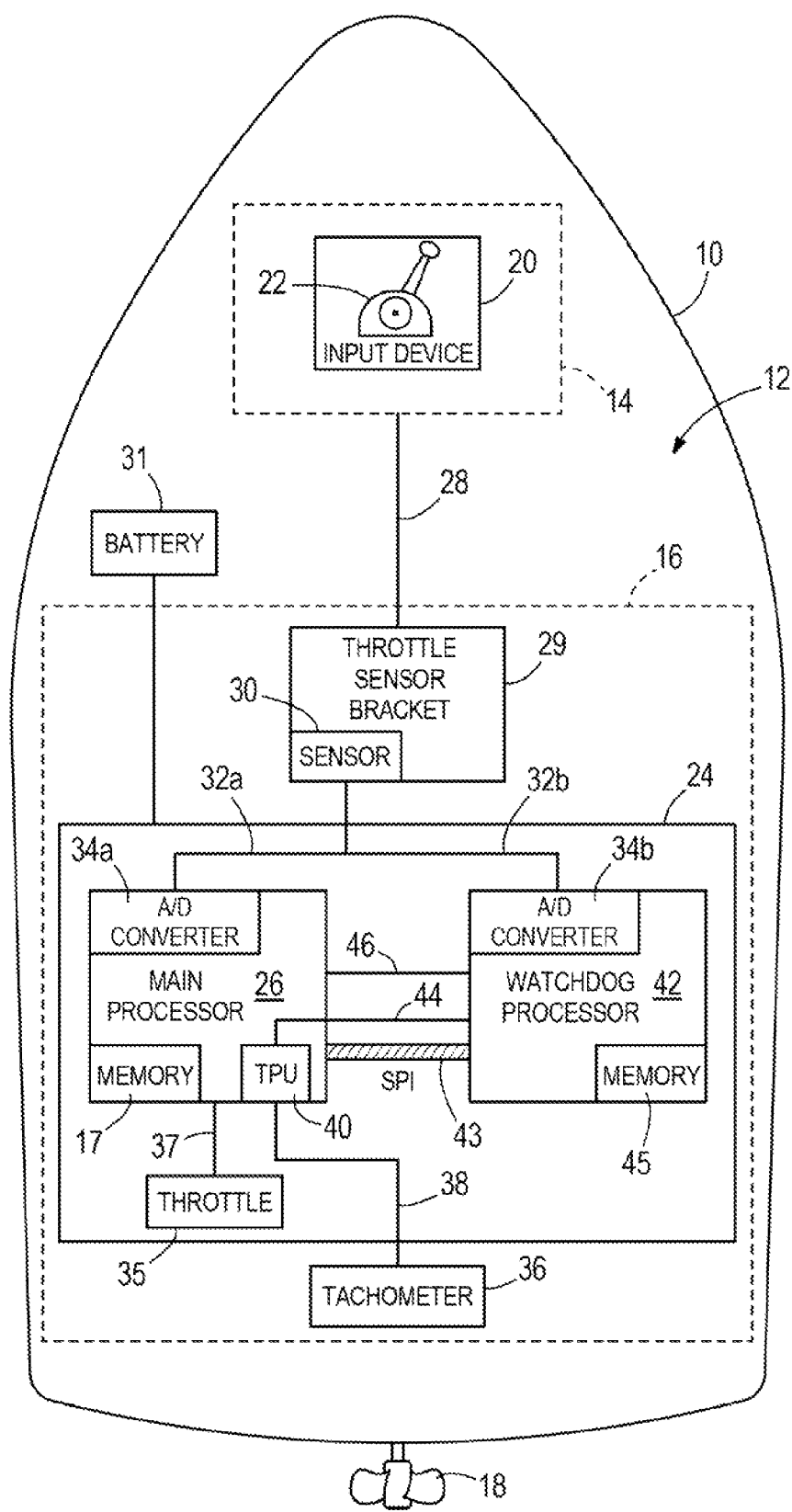
FIG. 1 is a schematic view of a system for controlling a marine engine on a marine vessel.

FIG. 1 schematically depicts a marine vessel 10 having a drive-by-wire system 12. The marine vessel 10 has a helm 14, an internal combustion engine 16 and a propulsor 18. In certain examples, the propulsor 18 can be one or more propellers that are driven into rotation by the engine 16 to propel the marine vessel 10 in a direction of travel. The type and location of propulsor 18 can vary and is not critical. The helm 14 is remotely located from the engine 16. A user input device 20 is located at the helm 14. In certain examples, the user input device 20, among other things, can have a conventional shift and throttle lever 22 for manually controlling shift and throttle of the engine 16. The type of user input device 20 can vary from that which is shown and described.

Manual operation of the user input device 20 provides operator inputs to an engine control unit (ECU) 24, which is located with the engine 16. The ECU 24 is powered by a battery 31 and contains a programmable main processor 26 for receiving the inputs from the user input device 20 and for controlling operations of the engine 16 based on the inputs, including in this example the speed of the engine 16. The main processor 26 is communicatively connected to a computer readable medium 17 that includes volatile or nonvolatile memory upon which a computer readable code is stored. The main processor 26 accesses the computer readable medium 17 and upon executing the computer readable code, carries out functions as described herein. The computer readable medium 17 can be separate from the main processor 26 and/or the computer readable medium 17 can be a part of the main processor 26 or integrally connected to the main processor 26. In still further embodiments, the computer readable medium 17 may be implemented as a plurality of computer readable media for access by the main processor 26.

A mechanical cable 28 connects the input device 20 to a throttle sensor bracket 29 located with the engine 16. A position sensor 30 is located with the throttle sensor bracket 29 and is configured to sense movements of the mechanical cable 28, which reflect movements of (i.e. operator inputs to) the shift and throttle lever 22. The type of position sensor 30 can vary and in certain examples can include a potentiometer that outputs analog voltages based upon the noted movements of the mechanical cable 28. The analog voltages are communicated via a wired or wireless communication link 32a to an analog-to-digital converter 34a located with the main processor 26. The analog-to-digital converter 34a converts the analog voltage to a digital signal for further processing by the main processor 26. Based upon the digital signal, the main processor 26 is programmed to control the speed of the engine 16. For example, as the shift and throttle lever 22 is moved away from a neutral/idle position, the main processor 26 is programmed to open throttle 35 and thus increase speed of the engine 16. Conversely, as the shift and throttle lever 22 is moved towards a neutral/idle position, the main processor 26 is programmed to close throttle 35 and thus increase speed of the engine 16.

For safety reasons and to protect the engine 16 and its related peripheral devices from damage, the main processor 26 is programmed to not allow the speed of the engine 16 to increase above a certain speed threshold. This threshold is saved in the memory 17 of the main processor 26. In addition, the main processor 26 can be programmed to automatically decrease the speed of the engine 16 to idle speed upon detection of a fault in the system 12. A conventional tachometer 36 measures the actual speed of the engine 16 and communicates this information to the main processor 26 via a wired or wireless communication link 38. In this example, the main processor 26 has a Time Processing Unit (TPU) 40 that receives inputs from the tachometer 36 and converts these inputs to a digital engine speed signal for processing by the main processor 26. The TPU 40 is a semi-autonomous co-processor specifically designed to process time critical inputs and outputs. The TPU 40 operates with shared data with the main processor 26 and does not require periodic communications with the main processor 26. This gives the TPU 40 the ability to process time critical inputs and outputs regardless of the operational state of the main processor 26. Therefore, even when the main processor 26 has stopped or is failing to accomplish its desired operation TPU 40 can continue to operate.

The ECU 24 also contains a watchdog processor 42 that is separate from the main processor 26. Similar to the main processor 26, the watchdog processor 42 is communicatively connected to a computer readable medium 45 that includes volatile or nonvolatile memory upon which the computer readable code is stored. The watchdog processor 42 accesses the computer readable medium 45 and upon executing computer readable code, carries out functions as described herein. The computer readable medium 45 can be separate from the watchdog processor 42 and/or the computer readable medium 45 can be a part of the watchdog processor 42 or integrally connected to the watchdog processor 42. In still further embodiments the computer readable medium 45 may be implemented as a plurality of computer readable media for access by the watchdog processor 42.

Similar to the main processor 26, the watchdog processor 42 also receives the noted inputs from the user input device 20 via the position sensor 30. The watchdog processor 42 has an analog-to-digital converter 34b that receives the analog voltages output from the position sensor 30 via a wired or wireless communication link 32b. The analog-to-digital converter 34b converts the analog voltage to a digital signal for processing in the watchdog processor 42. Based upon the digital signal, the watchdog processor 42 is programmed to monitor the above-noted operations of the main processor 26. For example, as the shift and throttle lever 22 is moved away from a neutral/idle position, the watchdog processor 42 monitors the operations of the main processor 26 to verify that it properly opens throttle 35 of the engine 16 via link 37 and thus increases speed of the engine 16. Conversely, as the shift and throttle lever 22 is moved towards a neutral/idle position, the watchdog processor 42 monitors the operations of the main processor to verify that it properly closes throttle 35 and thus reduces speed of the engine 16. A communication link 43 is provided between the main processor 26 and the watchdog processor 42 and facilitates the noted monitoring and communication between the watchdog processor 42 during normal operations thereof. In one example, the communication link 43 is a serial peripheral interface bus (SPI) which is a synchronous serial data protocol commonly used by modern microprocessors.

During operations of the system 12, faults can occur that interrupt proper communication between the processors 26, 42 or that cease proper communication between the processors 26, 42 altogether. For example, the main processor 26 can malfunction, thus preventing its ability to properly control the engine 16 and/or preventing its ability to properly communicate with the watchdog processor 42. In other examples, the communication link 43 can itself malfunction, thus preventing communication between the processors 26, 42, even though the processors 26, 42 may be properly operating. In these instances, the watchdog processor 42 typically is not able to determine whether the fault arose because of a malfunctioning of the main processor 26 or a malfunctioning of the communication link 43, or both. Thus, when communication is interrupted or ceases altogether, in order to safely prevent unintended changes in speed of the engine 16 and particularly unintended increases in speed of the engine above the noted speed threshold, the watchdog processor 42 can be programmed to cause the main processor 26 reset (i.e. turn off and then turn back on). A reset link 46 is provided between the main processor 26 and the watchdog processor 42. The reset link 46 is an electrical connection carrying a digital signal which functions regardless of the operational state of communication link 43. The electrical connection is between pins on the main microprocessor 26 and the watchdog processor 42 and can be a direct electrical connection via wire or circuit board trace or could be an indirect electrical connection via wire or circuit board trace through other passive or active electrical components. The watchdog processor 42 can be programmed to output a reset command to the main processor 26 via the reset link 46 when the engine speed signal from the TPU 40 indicates that the engine 16 is operating at a speed that is above the noted threshold. Alternately, the watchdog processor 42 can be programmed to output a reset command to the main processor 26 when the watchdog processor 42 determines that the speed at which the engine 16 is operating is not reduced to idle speed. The reset link 46 allows the watchdog processor 42 to command the main processor 26 to reset and thereby hopefully resolve the problem.

However, the present inventors have determined that resetting the main processor 26 can be highly undesirable because it can cause the engine 16 to stall and thus potentially can leave the operator of the marine vessel 10 stranded. For example, in instances where the communication link 43 is malfunctioning, but the main processor 26 is properly functioning, it is not desirable for the watchdog processor 42 to unnecessarily reset the main processor 26. To overcome this problem, the present inventors have designed the present system 12 in a manner that allows the watchdog processor 42 to better manage communication faults/errors (e.g. faults in the operational conditions of the main processor 26 and/or the communication link 43) without necessarily resetting the main processor 26, and therefore without potentially causing the engine 16 to stall. The system 12 thus can increase safety and also protect the engine 16 and its peripheral components by preventing unintended acceleration of the vessel 10 during fault situations.

As shown in FIG. 1, an engine speed link 44 is provided between the main processor 26 to the watchdog processor 42. In this example, the engine speed link 44 is an electrical connection carrying a digital signal that has a frequency proportional to the engine speed. The electrical connection is between pins on the main microprocessor 26 and the watchdog processor 42 and can be a direct electrical connection via wire or circuit board trace or could be an indirect electrical connection via wire or circuit board trace through other passive or active electrical components. The TPU 40, which as explained above operates regardless of the operational state of the main processor 26, communicates engine speed signals to the watchdog processor 42, thus informing the watchdog processor 42 of the speed at which the engine 16 is operating.

When communication fails between the main processor 26 and the watchdog processor 42, the watchdog processor 42 is programmed to determine (e.g. infer) whether the main processor 26 is properly functioning based upon the speed of the engine 16, as communicated to the watchdog processor 42 via the engine speed link 44. More specifically, regardless of the operating condition of the main processor 26 and communication link 43, the tachometer 36 continues to measure present speed of the engine 16 and communicate this information to the TPU 40. In turn, the TPU 40 continues to output engine speed signals representative of the current speed of the engine 16 to the watchdog processor 42 via the engine speed link 44.

As explained above, the main processor 26 is programmed to limit the speed at which the engine 16 is operating to below a threshold. When communication fails between the main processor 26 and the watchdog processor 42, the watchdog processor 42 is programmed to monitor the speed of the engine 16 and to reset the main processor 26 when the speed of the engine 16 is above the noted threshold. If the speed of the engine 16 is below the threshold, the watchdog processor 42 will assume or infer that the main processor 26 is properly functioning and assume or infer that the reason for non-communication between the main processor 26 and watchdog processor 42 is due to a peripheral error not related to the main processor 26, such as a malfunctioning of communication link 43.

Figure 2:
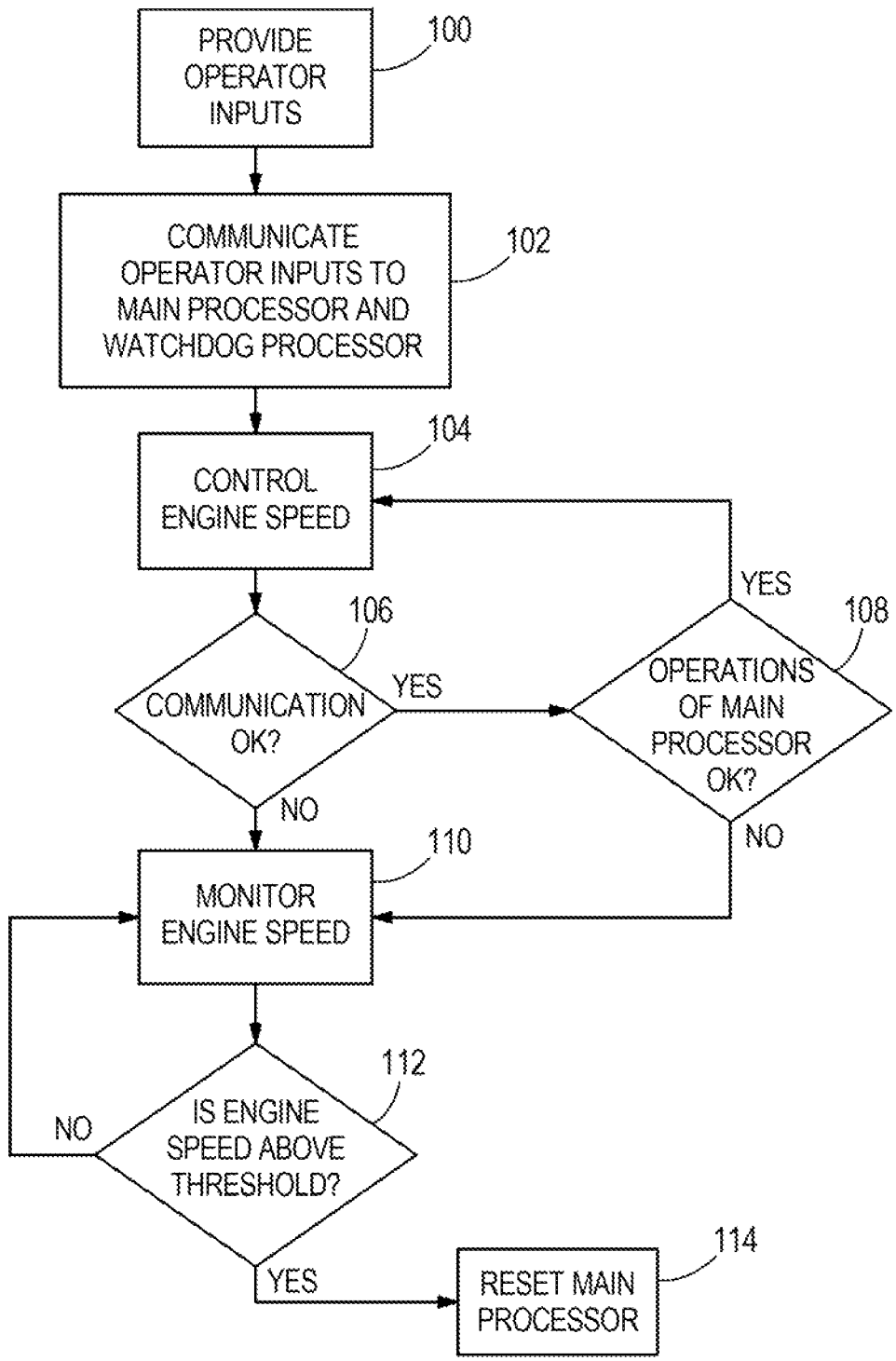
FIG. 2 is a flow chart depicting a method for controlling a marine engine on a marine vessel.

FIG. 2 depicts one example of a method of operating a drive-by-wire control system 12 for a marine engine 16. The method includes, at step 100, providing operator inputs to the ECU 24 located with the engine 16. At step 102, the operator inputs are communicated to the main processor 26 and the watchdog processor 42 via the communication links 32a, 32b. At step 104, the main processor 26 controls the speed of the engine 16 based upon the operator inputs. At step 106, the watchdog processor 42 determines whether communication is properly occurring between the main processor 26 and watchdog processor 42. If yes, at step 108, the watchdog processor 42 monitors operations of the main processor 26 based upon the operator inputs. If yes, the method returns to step 104. If the answer is no at either of steps 106 or 108, at steps 110 and 112, the watchdog processor 42 determines whether the main processor 26 is properly functioning based upon the speed of the engine 16. More specifically, speed of the engine 16 is output from the tachometer 36 to the TPU 40. In turn, the TPU 40 outputs an engine speed signal to the watchdog processor 42 via the engine speed link 44. At step 110, the watchdog processor 42 monitors the engine speed signal. At step 112, the watchdog processor 42 compares the engine speed signal to a threshold. If the engine speed signal is below the threshold, at step 110, the watchdog processor 42 continues to monitor the speed of the engine 16. If the engine speed signal is above the noted threshold, at step 114, the watchdog processor 42 resets the main processor 26 via the reset link 46. In another example, the watchdog processor 42 can be programmed to determine whether the speed of the engine 16 is not reducing or has not reduced to idle speed. If so, the watchdog processor 42 can be programmed to reset the main processor 26.

If the engine speed signal indicates that the engine 16 has reduced to idle speed, then the watchdog processor 42 can be programmed to assume that the main processor 26 is still functioning, has also recognized the loss of communication, and has reverted to a forced idle mode under its fault management programming. In this case, there is no need to reset the main processor 26. Conversely, if the watchdog processor 42 monitors the engine speed signal and finds that the engine 16 is not reducing to idle speed, then the watchdog processor 42 can be programmed to reset the main processor 26. This reserves the reset option for situations where the main processor 26 is not in control, but also when the speed at which the engine is operating is high. Elevated engine speed creates more rotating inertia of the engine 16 and can be used to keep the engine 16 spinning while the main processor 26 is being reset, thereby preventing stalling of the engine 16.

There are several other advantages to resetting the engine 16 based upon the engine speed signal, as opposed to providing another type of communication link to the watchdog processor 42. First, whatever problem caused the lack of communication between the respective processors 26, 42 has a high likelihood of affecting other similar communications, but likely will not affect the signal path from the tachometer 36. Second, there are cost advantages to using the signal from the tachometer 36. Watchdog processors 42 are typically very small and inexpensive because they do not perform heavy processing. A larger, more expensive microprocessor may have to be selected to add hardware functionality and a second communication bus, which could otherwise be avoided by simply monitoring the noted engine speed signals. Third, adding another communication bus and keeping it synchronized with the communication link 43 adds complexity to the software. Further, the output from the tachometer 36 is processed by the TPU 40 of the main processor 26. Despite not being on its own silicon chip, the TPU 40 serves as another processor that reads hardware pins for the crank position sensor and generates the engine speed signals and other signals. This separation from the processing functions of the main processor 26 makes the engine speed signal ideal for communicating engine speed to the watchdog processor 42.

What is claimed is:

1. A drive-by-wire control system for a marine engine, the control system comprising:
   an input device that is manually operable to provide operator inputs to an engine control unit (ECU) located with the engine;
   wherein the ECU has a main processor that receives the inputs and controls speed of the engine based upon the inputs;
   wherein the ECU has a watchdog processor that receives the inputs and monitors operations of the main processor based upon the inputs; and
   a communication link by which the operations of the main processor are communicated to the watchdog processor;
   wherein the watchdog processor determines whether communication is properly occurring between the main processor and the watchdog processor; and
   wherein the watchdog processor monitors the speed of the engine, and consequential to one of interruption and cessation of communication between the main processor and the watchdog processor, the watchdog processor infers whether the main processor is properly functioning based upon the speed of the engine.

2. The control system according to claim 1, comprising an engine speed link by which the speed of the engine is communicated from the main processor to the watchdog processor.

3. The control system according to claim 2, wherein the engine speed link is an electrical connection carrying a signal whose frequency is proportional to engine speed.

4. The control system according to claim 3, wherein the communication link is a serial peripheral interface (SPI).

5. The control system according to claim 3, comprising a tachometer that outputs the speed of the engine to the main processor.

6. The control system according to claim 5, wherein the main processor comprises a time processing unit (TPU) that generates engine speed signals based upon outputs of the tachometer and then communicates the engine speed signals to the watchdog processor via the engine speed link.

7. The control system according to claim 6, wherein the TPU generates the engine speed signals regardless of whether the main processor is functional.

8. The control system according to claim 1, wherein when the communication fails, the watchdog processor causes the main processor to reset when the watchdog processor determines that the speed of the engine is not reducing to an idle speed.

9. The control system according to claim 1, wherein when the communication fails, the watchdog processor causes the main processor to reset when the watchdog processor determines that the speed of the engine is above a threshold speed.

10. The control system according to claim 9, comprising a reset link via which the watchdog processor commands the main processor to reset, wherein the reset link is an electrical connection carrying a digital signal.

11. The control system according to claim 1, wherein the input device comprises a throttle lever and wherein the system further comprises a sensor that outputs analog-to-digital counts representing positions of the throttle lever.

12. The control system according to claim 11, wherein the sensor is connected to the throttle lever by a mechanical cable.

13. A drive-by-wire control system for a marine engine, the control system comprising:
   an input device that is manually operable to provide operator inputs to an engine control unit (ECU) located with the engine;
   wherein the ECU has a main processor that receives the inputs and controls speed of the engine based upon the inputs;
   wherein the ECU has a watchdog processor that receives the inputs and monitors operations of the main processor based upon the inputs;
   a communication link by which the operations of the main processor are communicated to the watchdog processor; and
   a pin via which the speed of the engine is communicated to the watchdog processor;
   wherein the main processor limits the speed of the engine to below a threshold; and
   wherein the watchdog processor determines whether communication is properly occurring between the main processor and the watchdog processor; and
   wherein the watchdog processor monitors the speed of the engine, and consequential to one of interruption and cessation of communication between the main processor and the watchdog processor, the watchdog processor resets the main processor when the speed of the engine is above the threshold.

14. A method of operating a drive-by-wire control system for a marine engine, the method comprising:
   providing operator inputs to an engine control unit (ECU) located with the engine;
   controlling, with a main processor located in the ECU, a speed of the engine based upon the inputs;
   receiving the inputs with a watchdog processor located in the ECU;
   monitoring, with the watchdog processor, operations of the main processor based upon the inputs;
   determining, with the watchdog processor, whether communication is properly occurring between the main processor and the watchdog processor; and
   monitoring, with the watchdog processor, the speed of the engine;
   wherein consequential to one of interruption and cessation of communication between the main processor and the watchdog processor, inferring, with the watchdog processor, whether the main processor is properly functioning based upon the speed of the engine.

15. The method according to claim 14, comprising outputting with a tachometer the speed of the engine to the main processor.

16. The method according to claim 14, comprising communicating the speed of the engine to the watchdog processor regardless of whether the main processor is functional.

17. The method according to claim 14, comprising resetting the main processor when the watchdog processor determines that the speed of the engine is not returning to an idle speed.

18. The method according to claim 14, comprising resetting the main processor when the watchdog processor determines that the speed of the engine is above a threshold.

19. A control system for controlling a marine engine, the control system comprising:
an engine control unit (ECU) having a main processor;
an input device that provides operator inputs to the main processor; wherein the main processor controls speed of the engine based upon the operator inputs;
a watchdog processor that receives the operator inputs and monitors operations of the main processor based upon the operator inputs;
a communication link by which the operations of the main processor are communicated to the watchdog processor; and
a processing unit that monitors the speed of the engine and communicates the speed of the engine to the watchdog processor via an engine speed link, wherein the processing unit communicates the speed of the engine to the watchdog processor at least when the main processor and the watchdog processor are not communicating;
wherein the watchdog processor determines whether communication is properly occurring between the main processor and the watchdog processor; and
wherein the watchdog processor, at least when the main processor and the watchdog processor are not communicating, determines whether the main processor is properly functioning based upon the speed of the engine.

20. The control system according to claim 19, wherein the main processor is configured to reduce the speed of the engine to an idle speed when the speed of the engine exceeds a threshold speed; and wherein when the main processor and the watchdog processor are not communicating, the watchdog processor causes the main processor to reset when the watchdog processor determines that the speed of the engine is not reduced to the idle speed.

21. The control system according to claim 20, comprising a reset link via which the watchdog processor commands the main processor to reset.

22. The control system according to claim 19, wherein the main processor is configured to reduce the speed of the engine to an idle speed when the speed of the engine exceeds a threshold speed; and wherein when the main processor and the watchdog processor are not communicating, the watchdog processor causes the main processor to reset when the watchdog processor determines that the speed of the engine is above the threshold speed.

23. A method for controlling a marine engine, the method comprising:
providing an engine control unit (ECU) having a main processor;
controlling a speed of the engine with the main processor based upon operator inputs;
monitoring operations of the main processor with a watchdog processor that receives the operator inputs;
communicating the operations of the main processor to the watchdog processor via a communication link;
determining, with the watchdog processor, whether communication is properly occurring between the main processor and the watchdog processor;
communicating the speed of the engine to the watchdog processor when the main processor and the watchdog processor are not communicating; and
determining whether the main processor is property functioning based upon the speed of the engine when the main processor and the watchdog processor are not communicating.

24. The method according to claim 23, wherein the main processor is configured to reduce the speed of the engine to an idle speed when the speed of the engine exceeds a threshold speed; and further comprising causing the main processor to reset when the main processor and the watchdog processor are not communicating and the speed of the engine is not reduced to the idle speed.

25. The method according to claim 23, wherein the main processor is configured to reduce the speed of the engine to an idle speed when the speed of the engine exceeds a threshold speed; and further comprising causing the main processor to reset when the main processor and the watchdog processor are not communicating and the speed of the engine is above the threshold speed.

* * * * *

UNITED STATES PATENT AND TRADEMARK OFFICE
CERTIFICATE OF CORRECTION

PATENT NO. : 9,278,746 B1
APPLICATION NO. : 13/904878
DATED : March 8, 2016
INVENTOR(S) : Jason S. Arbuckle et al.

It is certified that error appears in the above-identified patent and that said Letters Patent is hereby corrected as shown below:

Claims

In claim 23, at column 10, line 28, "property" should instead read --properly--.

Signed and Sealed this
Third Day of May, 2016

Michelle K. Lee
*Director of the United States Patent and Trademark Office*